Jan. 7, 1936.    H. O. SMITH    2,026,710
SIGNAL LIGHT FOR MOTOR VEHICLES
Filed June 30, 1933    2 Sheets-Sheet 1

Inventor
Harold O. Smith
By Edwin Hammel
Attorney

Jan. 7, 1936.  H. O. SMITH  2,026,710
SIGNAL LIGHT FOR MOTOR VEHICLES
Filed June 30, 1933  2 Sheets-Sheet 2

Harold O. Smith, Inventor

By Edwin H. Samuels, Attorney

UNITED STATES PATENT OFFICE 2,026,710

SIGNAL LIGHT FOR MOTOR VEHICLES

Harold O. Smith, Indianapolis, Ind.

Application June 30, 1933, Serial No. 678,511

3 Claims. (Cl. 177—329)

The invention relates to a direction signal light which is in the preferred form for purposes of compactness, neatness, cheapness and convenience, combined in a single casing with a stop and tail light. In view of the almost universal use of closed cars and the increasing tendency to operate them in rainy or cold weather with the windows closed, the difficulty incident to indicating by manual signals the intent to turn and the direction of the turn is such that the majority of drivers rely under such circumstances mainly on the stop light which is illuminated automatically on application of brakes. The necessity for a direction indicating signal is therefore increasing and such a signal device is in the process of adoption as stock equipment by several of the larger manufacturers of automobiles and as soon as such equipment becomes familiar to the general public in this way it will be required by law in the majority of States.

The present invention comprises a new and improved stop, tail and signal light, and particularly to a housing and front so constructed and arranged as to provide in a single unit two direction indicating arrows for pointing the direction of the proposed turn, together with a stop and a tail light window and means for illuminating the respective stop, tail and direction elements. The front is most conveniently of circular outline and the front and housing are not only of pleasing appearance but are actually ornamental and no larger than the ordinary stop and tail light, front and housing.

To this end the direction indicating pointers which are most conveniently in the form of arrows or more correctly, arrow heads which must be oppositely disposed and separately illuminated, are turned inwardly toward the center of the front so that they occupy only the space or but little more than the space or portion of the front plate which was formerly used to support the glass and separate the stop and tail light windows or openings where the colored glass which covers these openings is exposed.

In the preferred form of the invention the arrow points or arrows or other direction pointers are so disposed that their points or forward ends are closely adjacent each other on each side of the center, the flare of the arrow points or rear ends of the pointers being turned outwardly and terminating near the periphery. The arrows are preferably in the form of outline slots through which the rays from the lighted chamber within are passed, a colored glass preferably being so placed as to pass the colored rays only, and underlying each arrow slot is a chamber or casing or similar shape which chambers or casings meet substantially at the center so that they serve not only as housings for the respective bulbs by which the arrows are selectively illuminated, but they also serve to divide the casing into upper and lower stop and tail light chambers giving to these chambers the maximum amount of room for this purpose and providing for the enclosure therein of separate bulbs to illuminate the stop, the direction signal and the tail light, the chambers underlying the signal pointers being utilized as a division between the light chambers of the stop and tail lights. This is made possible by turning the direction signal pointers toward the center and making the registering light source chambers of corresponding shape so that no space which can be utilized for the stop and tail lights is occupied by the direction signal pointers and/or light chambers. With this arrangement a small neat casing not larger than the ordinary stop and tail light provides for the accommodation of tail and stop light windows of ample size and arrows or other pointers of sufficient size to enable them to be distinguished at a distance which provides for safe direction signalling. By pointing the arrows to the center they require the minimum of space at the center allowing amply sufficient space at the periphery of the front for the flare of the arrows which is toward the rim.

I have utilized the conventional stop and tail lamp, having inserted two direction signal lights in such a way as to serve as a division between stop and tail light compartments, without unfavorably reducing either and requiring no increase in size of stop and tail lamps.

The construction shown also has the advantage of a bulb mounting including partitions permanently secured to the front frame or plate and positive positioning means for the frame relatively to the housing or casing so that in case of hurried replacement of the bulbs or reassembling of the light under any circumstances there is no tendency to displace the partitions relatively to the front frame or spider and the strips of metal in front forming the outlines of the arrows and stop and tail light openings which are held in perfect alignment with the partitions at all times avoiding distortion of the arrow outline as formed by the cutaway portion of the front and/or of the stop and tail light windows.

Also, it is of primary importance that the front frame or spider and the front glass and bulb supports and partitions are removable as a unit, not only avoiding displacement as aforesaid but providing for the quick and convenient removal and replacement of the bulbs, and insuring at all times a positive engagement of the bulb terminals with the contacts which are mounted in a definite location at the base or back of the casing. This arrangement also avoids dropping and breaking of the glass and loss of parts.

In accordance with a secondary form of the invention these contacts may be mounted on the bulb supports and/or partitions so that they are removable with the front, i. e., the glass, the partitions and the bulbs, each contact being connected to a single plug which is seated in the regular type of socket provided at the rear of the ordinary light housing, making it possible for the manufacturer of the signal light to furnish the front frame and insides as a unit for insertion in a standard or stock type of housing which may be original equipment.

In the accompanying drawings I have illustrated a stop, tail and signal light unit, embodying the features of my invention in the preferred form, and also in a secondary form which is included within the scope of the invention.

Figure 1:
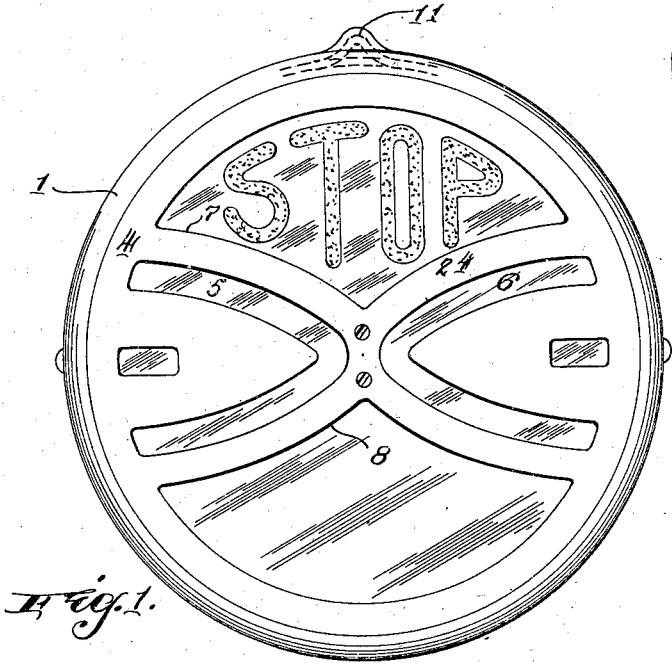
Figure 1 is a front view of the stop, tail and signal light of the invention as it would be seen from the rear of the vehicle on which it is mounted.
Figure 2:
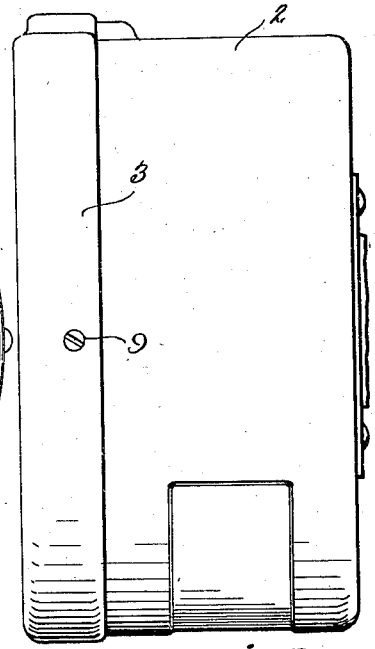
Figure 2 is a side elevation of the same.
Figure 4:
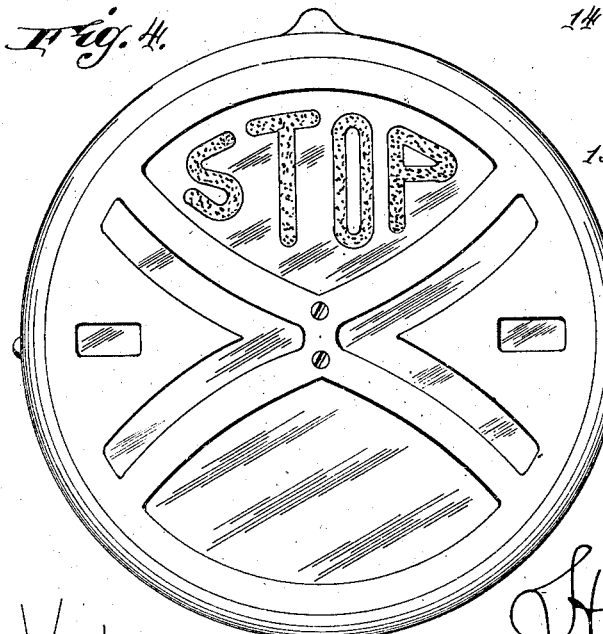
Figure 4 is a front view of the unit with a slightly different form of front, the arrows being concave instead of convex as in Figure 1.

Referring to the drawings by numerals, each of which is used to indicate the same or similar parts in the different figures, the construction shown comprises a front frame 1 which is preferably adapted to encircle and enclose the front of the housing or casing 2. This front frame or housing comprises a cylindrical rim 3 enclosing the front portion of the casing 2 as aforesaid and a flat front plate 4 which is slotted at 5 and 6 to form the arrow outlines and apertured at 7 and 8 to form the top and tail light windows, the spiderlike plate 4 and the rim being preferably formed in a single piece as by spinning. The front frame 1 may be fastened to the casing by means of screws 9 or in any suitable manner. It is also positively positioned to avoid angular displacement in any suitable manner as by means of a protuberance or small convexity 10 projecting outward radially from the front edge of the casing shown, at the top and capable of being placed at any convenient point, and a correspondingly placed registering concavity or protuberance 11 on the rim 3 of the front frame which in the form shown encloses and substantially fits the protuberance 10.

The frame 1 is provided within the rim 3 with any suitable type of packing 12 which may be sheet cork on which rests the glass 14 which is preferably in a single plate or piece tinted to suit the requirements, being in accordance with the prevailing practice red or orange. The portion of the glass covering the stop light window or opening 10 is marked with the word "stop" which in accordance with the regular practice is produced by grinding or sand blasting, or may be produced in any convenient manner. The central portion of the glass and the central portion of the front frame 1 as to the front plate or spider 4 are in accordance with the form shown bored with registering holes 15 and 16 to receive screws 17 as hereinafter more fully described.

Overlying the glass at the rear is a sheet of packing 18 which is most conveniently cut to register with the spider 4, being slotted and apertured to conform to the slots and openings in the spider which form the outline of the arrows and the openings for the stop and tail light windows and overlying the glass and this packing at the rear of the packing is the light support and partition member 19. This may also be referred to as a spider, being preferably formed of a single piece of metal, having a central U shaped body 20 with radiating partitions or legs 21. These legs are of width measured in the direction of the axis corresponding to and preferably equalling the depth of the housing back to the insulation 22 and positioned and curved to conform to the strips of metal 24 composing the front plate or spider 4 between the arrow slots 5, 6 and the stop and tail light window 7, 8. These partitions 21 when in place divide the casing or housing into the stop light chamber 25, the tail light chamber 26 and direction signalling light chambers 27, 28. These partitions 21 are in the preferred form of the invention shown apertured each of them at 29 to fit the shanks 30 of the respective light bulbs 31 and provided with bayonet slots 32 to receive and pass the locking pins 33 on the bulb shanks.

The spider or partition and supporting member 19 is in the preferred form secured to the front frame 1 with the transparent member or glass 14 in the form of a single circular sheet between the partition and bulb supporting member 19, and the plate 4 of the front frame with the packing 12, 18 on each side of the glass. The securing means is shown in the form of screws or screw bolts 17 or other suitable fastening means which are passed through the holes 15, 16 at the center of the front spider also extending through the glass and through the flat portion 35 of the body member 20. The fastening operation is completed by tightening nuts 36 on the screws 17 or in any suitable manner.

The rear wall of the casing on the inside is shown as provided with a plate of insulation 37 which may be secured in any suitable manner. Overlying this insulation and seated thereon are spring contact plates 38, one for each bulb. These plates as shown are of L shape, being secured by means of screws 39 passed through their bases 39' and through the rear of the casing. The bases 39' have contact screws 40 seated therein for connection to the conducting wires 41 and the upright arms of the spring contact plates are as shown most conveniently deflected at 42 to provide for a spring contact of these plates with the terminals 43 of the bulbs.

As shown, the insulation 22 is discontinued within the side walls of the casing, being of less diameter than the inside of the casing and the spider legs or partitions 21 are shouldered at 44 to extend beyond the insulation and engage the rear wall of the casing forming a complete closure between the adjacent compartments or chambers into which the casing or housing is divided by these partitions.

Figure 7:
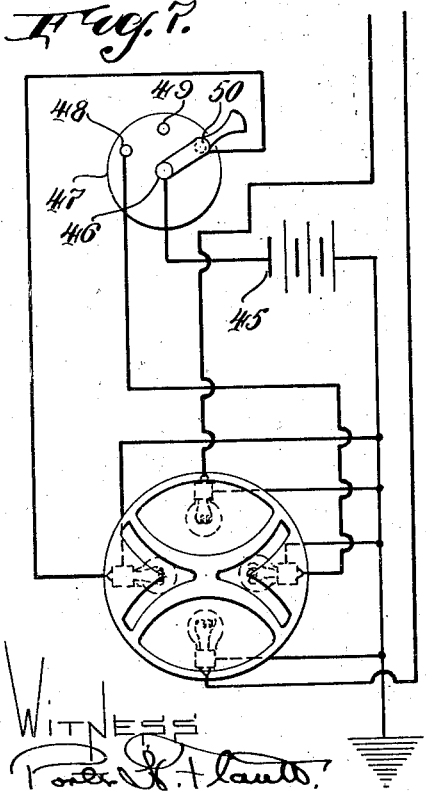
Figure 7 is a circuit diagram.
Figure 6:
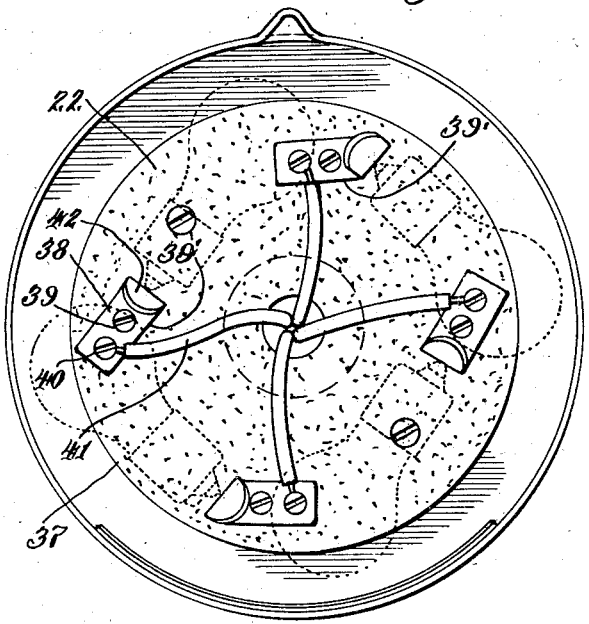
Figure 6 is a front view of the casing with the front, frame and glass partitions and bulb supports removed.

Figure 7 shows a convenient lighting circuit including a battery 45 which is connected at its opposite terminals to the pivot 46 of the switch 47 and to the light sockets 29 of all of the bulbs 31, respectively, and to the ground. The switch 47 has two contact points 48 and 50, each of which is connected to one of the contacts 40 corresponding to the direction signal lights. The switch also has a neutral point 49. The stop light terminal is connected to a brake pedal switch not shown in accordance with the regular practice, and the tail light is included in the circuit according to the regular practice. In operation the signal switch 47 is operated when a turn is to be made to illuminate the proper direction pointer.

Figure 3:
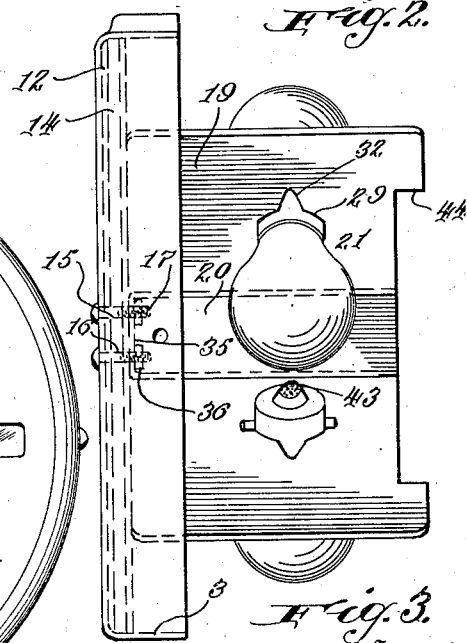
Figure 3 is a side elevation of the front frame, glass bulb supports, partitions and bulbs positively connected together as a single structure and removed for convenience of illustration.
Figure 5:
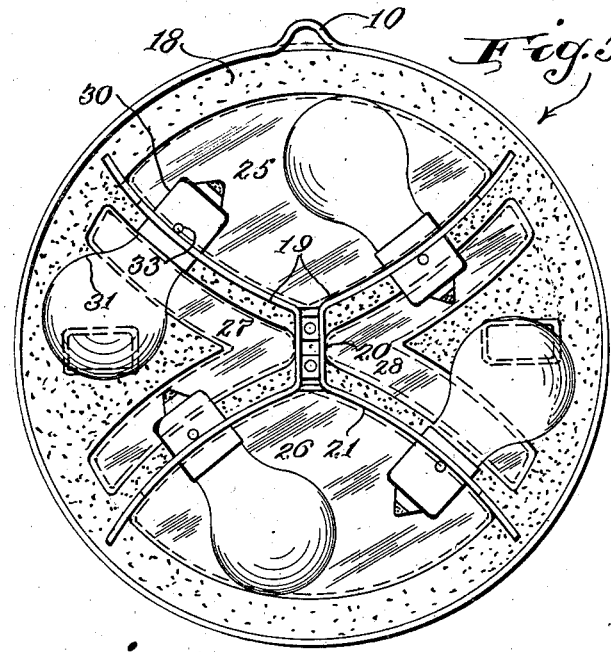
Figure 5 is a rear view of the front, frame, glass and insides removed as in Figure 3.

The manner of positively connecting the front and glass to partition and bulb supports, as shown in Figure 3, has been fully described. When this assembly member is removed on account of the necessity for replacing a bulb or for any purpose, the defective bulb is easily and instantaneously detached and a new bulb inserted with the greatest ease and convenience, the socket holes 29 being easily accessible. The assembled insides and front plate including the front glass partitions and front frame with the bulbs supported on the partitions or other suitable supports is then inserted in the casing, the rim 3 encircles the outside of the casing at the front and is positioned by the registering protuberances 10, 11 so that it can not be in any way dislocated or placed out of alignment. It is then secured by screws 9.

As the result of this arrangement and method of assembling, the terminals or contact points 43 of the bulbs are in definite and positive contact with the spring contact members 38 and therefore definitely included in the circuit, subject to the operation of the switch 47, and the arrow slots 5, 6 are definitely in registration with the signal light chambers 27, 28 so that the outline of these arrows cannot in any way be blurred or deranged. Also, the stop and tail light windows 7, 8 are in definite registration with the stop and tail light chambers 25, 26 and cannot, in any way, become deranged or dislocated.

Figure 8:
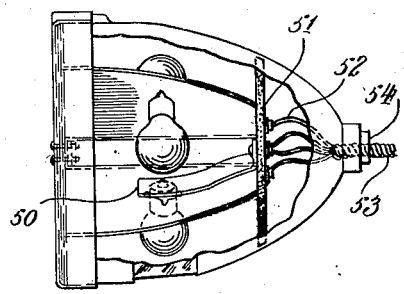
Figure 8 is a fragmentary view of the insides removed as in Figure 3, the contacts being mounted on the partitions or other bulb supports so that they are removed with the frame and partitions and replaced therewith, being connected to a single multiple plug which is seated in the conventional type of socket at the rear of the casing.

In Figure 8 I have shown a slightly different embodiment of my invention in which contact plates 50 engaging the bulb contacts are secured to a hard rubber plate 51 the plates being connected by wires 52 to a multiple cable 53, adapted to be passed through an opening 54 at the rear of the casing so that the insides of the stop, tail and signal light of the invention may be manufactured for insertion in almost any stock type of casing.

I have thus described specifically and in detail a direction signal light combined with a stop and tail light embodying my invention in the preferred form, in order that the manner of constructing, applying, operating and using the same may be clearly understood, however, the specific terms herein are used descriptively rather than in a limiting sense, the scope of the invention being defined in the claims.

What I claim as new and desire to secure by Letters Patent is:

1. In a direction signal light for motor vehicles, a light front having inwardly disposed arrow head pointer light openings which are at the right and left sides of said front, respectively, with their points substantially meeting at the center and flaring toward the rear of each arrow head, leaving a space above and a space below said points between the outer rear ends of said arrow heads and a light opening in one of said spaces substantially in vertical alignment with said arrow points.

2. In a direction signal light for motor vehicles a light front having arrow head pointer light openings with their points substantially meeting at the center of the front and flaring toward the rear of each said arrow head at the right and left sides of said front leaving a space above and a space below said points between the outer rear ends of said arrow heads, and other light openings, one in each of said spaces above and below said arrow points, respectively.

3. In a direction signal light for motor vehicles, a substantially circular light front having inwardly disposed arrow head pointer light openings with their points substantially meeting at the center of said circular front and flaring toward the rear of each said arrow head, at the right and left sides of said front, respectively, leaving spaces above and below said points, between the outer rear ends of said arrow heads and other light openings in said spaces, one above and the other below the said arrow points, respectively.

HAROLD O. SMITH.